US011923736B2

(12) United States Patent
Serghine et al.

(10) Patent No.: US 11,923,736 B2
(45) Date of Patent: Mar. 5, 2024

(54) ELECTRIC MACHINE WITH DEVICE FOR FORCIBLY DEMAGNETISING PERMANENT MAGNETS

(71) Applicant: SAFRAN HELICOPTER ENGINES

(72) Inventors: Camel Serghine, Moissy-Cramayel (FR); Thomas Klonowski, Moissy-Cramayel (FR); Loïs Pierre Denis Vive, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 136 days.

(21) Appl. No.: 17/416,867

(22) PCT Filed: Dec. 19, 2019

(86) PCT No.: PCT/FR2019/053183
§ 371 (c)(1),
(2) Date: Jun. 21, 2021

(87) PCT Pub. No.: WO2020/128348
PCT Pub. Date: Jun. 25, 2020

(65) Prior Publication Data
US 2022/0085706 A1    Mar. 17, 2022

(30) Foreign Application Priority Data
Dec. 20, 2018    (FR) ........................................ 1873641

(51) Int. Cl.
*H02K 21/02* (2006.01)
*B64D 27/24* (2006.01)
(Continued)

(52) U.S. Cl.
CPC ........... *H02K 21/028* (2013.01); *B64D 27/24* (2013.01); *H02K 1/17* (2013.01); *H02K 1/27* (2013.01); *H02K 9/00* (2013.01)

(58) Field of Classification Search
CPC . B64D 27/24; H02K 1/17; H02K 1/27; H02K 15/125; H02K 21/02; H02K 21/028; H02K 2213/06
See application file for complete search history.

(56) References Cited

U.S. PATENT DOCUMENTS

| 2006/0186754 | A1* | 8/2006 | Kitamura | ............. | H02K 21/028 |
| | | | | | 310/263 |
| 2018/0269760 | A1* | 9/2018 | Palmer | ................. | H02K 1/2795 |

FOREIGN PATENT DOCUMENTS

| CN | 102158031 A | 8/2011 | | |
| DE | 102017220941 A1 * | 5/2019 | ............. | B64D 27/24 |

(Continued)

OTHER PUBLICATIONS

DE-112018003438-T5, Kimoto, all p. 2020 (Year: 2020).*

(Continued)

*Primary Examiner* — Naishadh N Desai
(74) *Attorney, Agent, or Firm* — Sughrue Mion, PLLC (57) ABSTRACT

The present invention relates to an electric machine for an aircraft, comprising a stator and a rotor that is rotationally mobile with respect to the stator, the rotor or the stator comprising a plurality of permanent magnets, the machine comprising a device for demagnetising a permanent magnet, suitable for achieving a temporary increase in the temperature of the permanent magnet, in order to limit, during the temporary increase in temperature, an exciting magnetic flux generated by the permanent magnet. The present invention furthermore relates to an assembly comprising an assembly comprising such an electric machine and a hot-fluid source suitable for delivering hot fluid to the demagnetising device of the electric machine. The hot-fluid source may be a gas stream of a turbine engine.

14 Claims, 5 Drawing Sheets

(51) Int. Cl.
 H02K 1/17 (2006.01)
 H02K 1/27 (2022.01)
 H02K 9/00 (2006.01)

(56) References Cited

FOREIGN PATENT DOCUMENTS

| | | | |
|---|---|---|---|
| DE | 112018003438 T5 * | 4/2020 | ............... H02K 1/20 |
| EP | 0 573 658 A1 | 12/1993 | |
| EP | 2 200 161 A1 | 6/2010 | |
| FR | 3111244 A1 * | 12/2021 | |
| JP | 2001-346364 A | 12/2001 | |
| JP | 2006217752 A * | 8/2006 | ........... H02K 21/028 |
| JP | 3835126 B2 * | 10/2006 | |
| JP | 2018-064401 A | 4/2018 | |
| JP | 2018-170842 A | 11/2018 | |
| JP | 2019-037096 A | 3/2019 | |

OTHER PUBLICATIONS

FR-3111244-A1, Carles, all pages 2021 (Year: 2021).*
JP-2006217752-A, Akita, all pages (Year: 2006).*
JP-3835126-B2, Baba, all pages (Year: 2006).*
DE-102017220941-A1, Houshmand, all pages (Year: 2019).*
French Search Report and Written Opinion dated Oct. 16, 2019 in French Application No. 1873641.
International Search Report dated Mar. 5, 2020 in International Application No. PCT/FR2019/053183.
Written Opinion of the International Searching Authority dated Mar. 5, 2020 in International Application No. PCT/FR2019/053183.

* cited by examiner

ELECTRIC MACHINE WITH DEVICE FOR FORCIBLY DEMAGNETISING PERMANENT MAGNETS

CROSS REFERENCE TO RELATED APPLICATIONS

This application is a National Stage of International Application No. PCT/FR2019/053183 filed Dec. 19, 2019, claiming priority based on French Patent Application No. 1873641 filed Dec. 20, 2018, the entire contents of each of which being herein incorporate by reference in their entireties.

TECHNICAL FIELD OF THE INVENTION

The invention relates to the field of electric machines used for the generation of energy or the motorization of an aircraft, in particular of the helicopter type, vertical takeoff and landing or VTOL type, or short takeoff and landing or STOL type, or having electric propulsion.

PRIOR ART

It is current practice to carry electric machines in aircraft with electric or hybrid thermal/electric propulsion. In hybrid electric architectures, electrical generators can be driven by thermal power generation systems of the gas turbine type.

In order to reduce the overall mass on board, the electric machines preferred for these applications are synchronous machines with permanent magnets which have high power density per unit mass.

Figure 1:
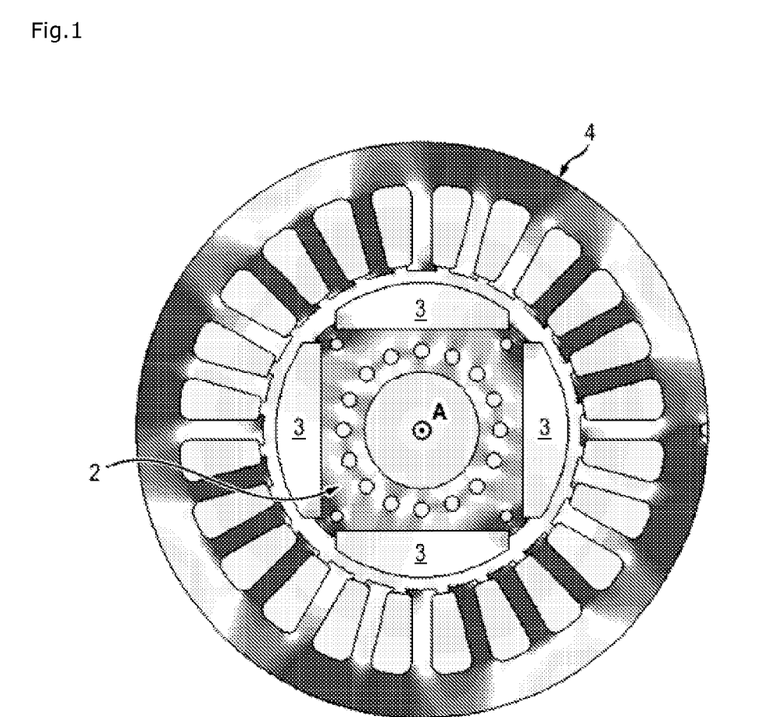
FIG. 1 illustrates a transverse section view of a synchronous machine with permanent magnets, according to the related art.

FIG. 1 gives a transverse section view of a synchronous machine with permanent magnets, carried for example in a helicopter. Here the machine of the radial flux type and has an overall cylindrical shape with axis A. It has a rotor 2 mobile in rotation around the axis A and positioned inside a fixed stator 4. Here, the synchronous machine includes four permanent magnets 3.

In this example, the magnets 3 are situated on the rotor and face windings positioned on the inner periphery of the stator.

The magnets 3 form two pairs of North/South magnetic poles. Also known are electric machines having more than three pairs of magnetic poles. In generator operation of the electric machine, the forced rotation of the magnets with respect to the windings produced an exciter magnetic flux, which in its turn produces a counter-electromotive force at the terminals of the windings.

In the electric machine of FIG. 1, in the case of a short-circuit at a winding, or in the case of another event drastically reducing the impedance of the winding, the voltage at the terminals of said winding does not drop as rapidly as the resistivity, because the permanent magnets continue to rotate.

The intensity of the electrical current circulating in the winding therefore increases very rapidly, exposing the winding to risks of overheating, of fusion of the insulators, etc. These risks are unacceptable for aeronautical applications where a high level of reliability of the equipment is required.

Solutions have therefore been sought for protecting the winding of a permanent magnet synchronous machine, during a short-circuit event of a winding.

It has been proposed to dimension the electrical circuit of the winding so that the circuit tolerates a current of high intensity, by adding copper mass to the winding and/or by reinforcing the insulation. This solution, however, increases the impact on mass of the electric machine and makes the manufacture of windings more complex.

Another existing solution consists of accomplishing momentary mechanical decoupling between the rotor of the electric machine and the power shaft of the thermal machine that drives the rotor. The decoupling is implemented, for example, by a clutch or a claw coupling, to allow an emergency stop of the rotation of the rotor. One solution of this type is described in patent application FR 3 057 029 in the Applicant's name, particularly in FIG. 2 where a decoupling device 23 is shown between an electrical generator and a propeller shaft. However, a device of this type is massive and reduces the transportable useful load of the aircraft.

In these extreme cases, it is also possible to completely stop the thermal machine which drives the rotor. However, if said thermal machine also ensures the movement of the helicopter propeller, it is not practicable to stop it during flight.

It has also been contemplated to replace the permanent magnet synchronous machine with a wound rotor machine, which has the advantage of allowing the rapid cancellation of the exciter rotating magnetic flux by cutting the power supply to the windings of the rotor. However, the presence of slip rings at the rotor limits the speed of the rotor. That is why the power density per unit mass of a wound rotor machine is not comparable to the power of a permanent magnet machine.

GENERAL DESCRIPTION OF THE INVENTION

Thus, the need arises for an electric machine intended to be carried aboard an aircraft, in which a winding fault event does not expose the windings to a risk of damage.

It is desired in particular to avoid an excessive increase of intensity of the induced electrical current in the event of a short-circuit of the winding.

The desired machine must satisfy the particular constraints of the aeronautical field, and thus have a minimum impact on the mass and the bulk of the aircraft.

The desired solution must also have a minimum impact on the useful transportable load within the aircraft.

For this reason, a first object of the invention is an electric machine for an aircraft, comprising a stator and a rotor mobile in rotation with respect to the stator, the rotor or the stator comprising a plurality of permanent magnets, the machine comprising a device for demagnetizing a permanent magnet suitable for implementing a temporary temperature increase of the permanent magnet, in order to limit, during the temporary temperature increase, an exciter magnetic flux generated by the permanent magnet.

The electric machine according to the invention comprises a demagnetization device which allows a rapid decrease in the exciter magnetic flux generated by a magnet, by increasing its temperature. The intrinsic property of demagnetization of magnetic materials during a temperature increase is advantageously used. What is meant by "demagnetization" is a cancellation of the magnetic induction of the magnet.

In particular, a threshold temperature, called the Curie temperature, cancels the magnetic induction of a permanent magnet.

The magnetic flux generated by the magnet can thus be rapidly reduced in case of a winding fault. The elapsed time during which the counter-electromotive force at the terminals of the winding remains high, while the winding is defective, is considerably reduced.

Preferably, each permanent magnet of the machine is associated with a demagnetization device, in order to allow a rapid reduction of the total magnetic flux of the magnets.

The optional and non-limiting features of the electric machine of the invention are the following, taken alone or in any one of the technically possible combinations:

the demagnetization device is configured to circulate a hot fluid in proximity to or within the permanent magnet.

the demagnetization device comprises a duct, a terminal portion of the duct leading to the surface of the permanent magnet or into an internal volume of the permanent magnet.

An advantage of this variant is the low mass of the duct, having a reduced impact on the transportable useful load.

one portion of the duct extends perpendicularly to an axis of a shaft of the rotor from the outside of the electric machine to an inside surface of the stator.

one portion of the duct extends along an axis of a shaft of the rotor, the terminal portion of the duct extending in the rotor from said portion to the permanent magnet.

the electric machine is of the radial flux type, the rotor having a cylindrical shape.

the electric machine is of the axial flux type, the rotor having a discoidal shape.

the permanent magnet has a Curie temperature, and the demagnetization device is suitable for implementing a temporary temperature increase of the permanent magnet beyond the Curie temperature.

the electric machine further comprises a winding arranged so that an induced electrical current circulates in the winding under the influence of an exciter magnetic flux produced by the permanent magnet during the rotation of the rotor, the machine further comprising a winding fault sensor, the demagnetization device being configured to implement the temperature increase of the permanent magnet during a detection of a winding fault.

A second object of the invention is an assembly comprising an electric machine as defined above, as well as a hot fluid source, suitable for supplying hot fluid to the demagnetization device of the electric machine.

Possible and non-limiting features of this assembly are the following, taken alone or in any one of the possible combinations:

the assembly further comprises a gas/gas or gas/liquid heat exchanger, the heat exchanger being positioned between the hot fluid source and the electric machine.

the assembly comprises a turbomachine having a gas stream which serves as a hot fluid source during the operation of the turbomachine, and comprises a hot gas extraction element in the gas stream.

the extraction element is suitable for admitting hot gas from an extraction plane defined perpendicularly to an axis of the turbomachine, the extraction plane being selected from among:

a plane called plane P3, extending over an outlet of a final compressor stage of the turbomachine, the final stage being located immediately upstream of a combustion chamber of the turbomachine;

a plane called plane P2.5, extending over an outlet of a compressor stage of the turbomachine different from the final compressor stage;

the extraction element is suitable for admitting hot gas from an extraction point located in an exhaust nozzle of the turbomachine;

the assembly further comprise a suction device in proximity to the extraction element;

the turbomachine is suitable for driving the rotor of the electric machine of the assembly.

The invention also relates to an aircraft comprising an assembly defined above, the aircraft being typically a helicopter or a hybrid thermal/electric generation aircraft.

GENERAL DESCRIPTION OF THE FIGURES

Other features, aims and advantages of the invention will apparent from the following description, which is purely illustrative and not limiting, and in which.

DETAILED DESCRIPTION OF EMBODIMENTS

The following description describes examples of synchronous permanent magnet machines, in which the permanent magnets are located on the rotor and driven in rotation with respect to the stator.

The examples hereafter relate to a synchronous machine in generator mode, the rotor being driven in rotation to enter into interaction with the stator and produce electrical energy. Moreover, described hereafter is a radial flux synchronous machine in which the rotor has a cylindrical shape overall and is positioned inside the stator.

The invention applies, however, with the same advantages, to the case of a machine in which the permanent magnets are fixed and located in the stator and/or to the case where the electric machine has axial flux. More generally, the invention can find application in any electric machine including any number of magnets.

It will also be noted that, if the demagnetization device is activated mainly in winding fault situations in the examples hereafter, it is possible to contemplate triggering the demagnetization device in any other event necessitating a rapid reduction of the magnetic flux generated by the magnets.

In the description hereafter and in the appended figures, similar elements are designated by the same alphanumeric references.

Figure 2:
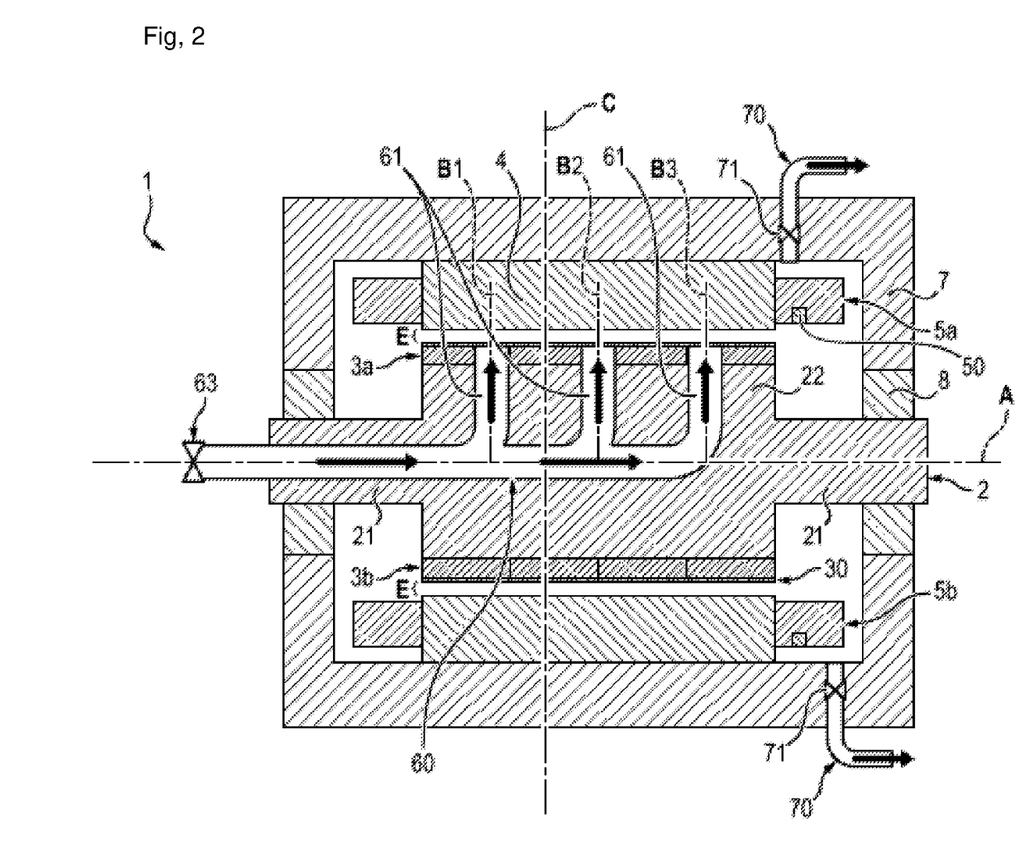
FIG. 2 is a schematic longitudinal section view of a synchronous permanent magnet machine according to a first embodiment of the invention.

Shown in FIG. 2 is a synchronous permanent magnet machine 1 according to a first embodiment of the invention. Here, the machine 1 is used as an electrical generator for a helicopter. It could however be used in another type of aircraft, particularly an aircraft with hybrid thermal/electric generation. In FIG. 2, the machine 1 is seen in longitudinal section in a plane passing through the axis A of the shaft of the rotor 2.

For a better understanding of the figures, a section plane C perpendicular to the axis A is shown. A transverse section view (not shown in the appended figures) in the section plane C would give a similar general structure to that of FIG. 1 showing a machine of the prior art.

In one example of the architecture of the helicopter, the machine 1 is integrated within a PAGB, or "Power Accessories Gear Box." The machine 1 can for example be positioned in the aircraft in conformity with the architecture described in patent application FR 3 057 029 in the Applicant's name.

The machine 1 comprises a stator 4 and a rotor 2 mobile with respect to the stator 4. The shaft of the rotor 2 is driven in rotation by a power shaft of a turbomachine located in the helicopter. The machine 1 has radial flux, the rotor 2 being cylindrical overall and positioned inside the stator 4. The rotor and the stator are located in a housing 7 which delimits the electric machine. As an alternative, the machine could have axial flux and the rotor 2 could be of the discoidal type.

In one possible configuration, the shaft of the rotor 2 of the electric machine 1 is driven by a gas turbine. The machine 1 is then mounted on a transmission case driven by a power takeoff shaft connected to the main shaft of the gas turbine.

The rotor comprises a plurality of permanent magnets 3. Here, the rotor comprises four magnets including two diametrically opposed North magnets and two diametrically opposed South magnets.

Here the magnets 3 are regularly distributed on the surface over the central portion 22 of the shaft of the rotor, two consecutive magnets being separated by 90°. The central portion of the shaft of the rotor has a larger radius with respect to the end portions 21 of the shaft. Magnets 3a (top) and 3b (bottom) are visible in the view of FIG. 2.

It will be understood that other geometries of the magnets can be contemplated: radial or ortho-radial magnets, buries magnets, magnets inserted in a squirrel cage configuration for asynchronous starting.

The machine having radial flux, the stator 4 has the general shape of a hollow cylinder. Magnetic poles, regularly distributed over the internal surface of the stator, extend in the direction of the rotor. A winding, comprising copper wire for example, is wound around each of the magnetic poles. An electrical current can circulate inside each winding.

A cylindrical collar 30 is located on the surface of each of the magnets, to hold the magnets. A distance E, called the air gap, separates the outside surface of the collars and the inside periphery of the poles of the stator 4. Preferably, the air gap E is comprised between 0.5 millimeters and 10 millimeters. Here, there is no slip ring.

In the angular position of the rotor shown in FIG. 2, the magnet 3a is located in proximity to a winding 5a and the magnet 3b is located in proximity to a winding 5b.

The housing 7 is of generally cylindrical shape. It is perforated along the axis A for the insertion of the rotor 2. The stator 4 is integral with the housing 7. The rotor 2 is supported by bearings 8 in its rotation with respect to the assembly formed by the stator 4 and the housing 7.

In conformity with the invention, the machine 1 comprises a device for demagnetizing the permanent magnet 3a. A function of the demagnetization device is to implement, on command, a temporary temperature increase of the permanent magnet 3a. The temporary temperature increase limits the exciter magnetic flux generated by the interactions between the magnetic field of the magnet 3a in motion and the magnetic field of the windings of the stator.

In fact, an increase in temperature of the magnet 3a reduces the coercive field of the magnet, or the level of the demagnetizing field which cancels its magnetic induction. Beyond a Curie temperature of the magnet, the magnetic induction of the magnet is cancelled, even in the absence of a demagnetizing field.

By "magnetic induction" is meant the volume density of the magnetic moment characteristic of the magnetic behavior of the magnet, from which depends the exciter magnetic flux generated by the relative movement of the magnet and of the stator. The "demagnetizing field" is then the magnetic field to be applied to the magnet to cancel its magnetic induction.

In the example of FIG. 2, the demagnetizing device is configured to circulate hot fluid in proximity to the permanent magnet 3a. More precisely, the demagnetization device comprises a duct 60, continuing into a plurality of terminal portions 61 of duct 60, having respective axes B1, B2 and B3 which are mutually parallel. Each of the terminal duct portions leads within the internal volume of the magnet 3a.

The internal volume of the magnet 3a is in fluid communication with the left end of the duct 60. Thus, the duct 60 and the terminal portions 61 provide a passage for receiving the hot fluid, typically hot air, from a source outside the electric machine, and to bring this hot fluid in proximity to the magnet.

The duct assembly allows bringing a flow of hot fluid as close as possible to the magnet 3a.

In the example of FIG. 2, the duct 60 extends along the axis A of the shaft of the rotor. The left end of the duct passes through the left end of the shaft of the rotor in FIG. 2. The duct continues until a plane near the right end of the central portion 22 of the shaft of the rotor 2.

The set of ducts described above constitutes a forcible demagnetization device for the permanent magnet 3a.

In one advantageous variant, the permanent magnet 3a has one or more internal channels running through it suitable for admitting a fluid, for example a heat transfer fluid. Heat exchanges are thus enabled in the internal volume of the magnet, which reduces the response time of the magnet with regard to the heat supplied by the demagnetization device. Demagnetization is thereby accelerated. These internal channels extend for example longitudinally in the internal volume of the magnet, in a direction substantially parallel to the axis A.

Moreover, it will be noted that it is possible to complete the action of the demagnetization device by the action of a magnetic flux at the stator, to create a demagnetizing field.

Preferably, a valve 63 is located at the left end of the duct 60, to control an admission of hot fluid. The valve 63 is controllable electronically, for example by an on-board computer carried in the helicopter. The valve 63 can be a valve of the on/off type, or a proportional valve.

When hot fluid is admitted by the duct 60, this hot fluid transmits heat to the internal volume of the magnet 3a to trigger a temperature increase of the magnet.

For the evacuation of the hot fluid inside the housing 7, it is advantageous to place evacuation ducts 70, of which a first end leads within the internal volume of the housing and of which a second end leads out of the housing. The activation of the evacuation is controllable by evacuation valves 71 linked to the computer of the helicopter. The ducts 70 allow avoiding an overpressure within the housing 7.

In generator operation, an induced current circulates in the winding 5a under the influence of the exciter magnetic flux of the magnets, and in particular of the magnet 3a. In the event of a short-circuit of the winding 5a, if the magnets continue to rotate (and therefore to produce magnetic flux), an induced current of very high intensity, greater than a damage threshold of the winding which can attain several hundred amperes, can circulate in the winding.

Advantageously, the machine 1 comprises a winding damage sensor 50. The sensor 50 is able to communicate data to a computer of the helicopter. The demagnetization device is configured (via the valve 63) to trigger the temperature increase of the permanent magnet 3a in the event of risk of damage to the winding, for example during a short-circuit event. It is thus possible to protect the short-circuited winding.

In a preferred configuration, each of the permanent magnets 3 of the machine 1 can be heated by a demagnetization device. For example, the duct 60 can continue into other terminal portions (not shown) leading into proximity of each of the permanent magnets, particularly in proximity to the permanent magnet 3b.

One advantage of this variant is to allow limiting, even completely cancelling the induced current generated by all the permanent magnets in the windings.

Preferably, each winding of the electric machine has a damage sensor, in order to be able to protect each of the windings in case of short-circuit.

In one possible variant (not shown in the figures), the demagnetization device can be linked to a gas/gas or gas/liquid heat exchanger, the gas being air for example, the liquid being oil, fuel or water for example. The heat exchanger is then placed between the hot fluid source (a gas turbine engine in the example hereafter) and the electric machine. The heat exchanger allows controlling and adapting the input temperature of the fluid admitted from the external heat source into the electric machine.

Figure 3:
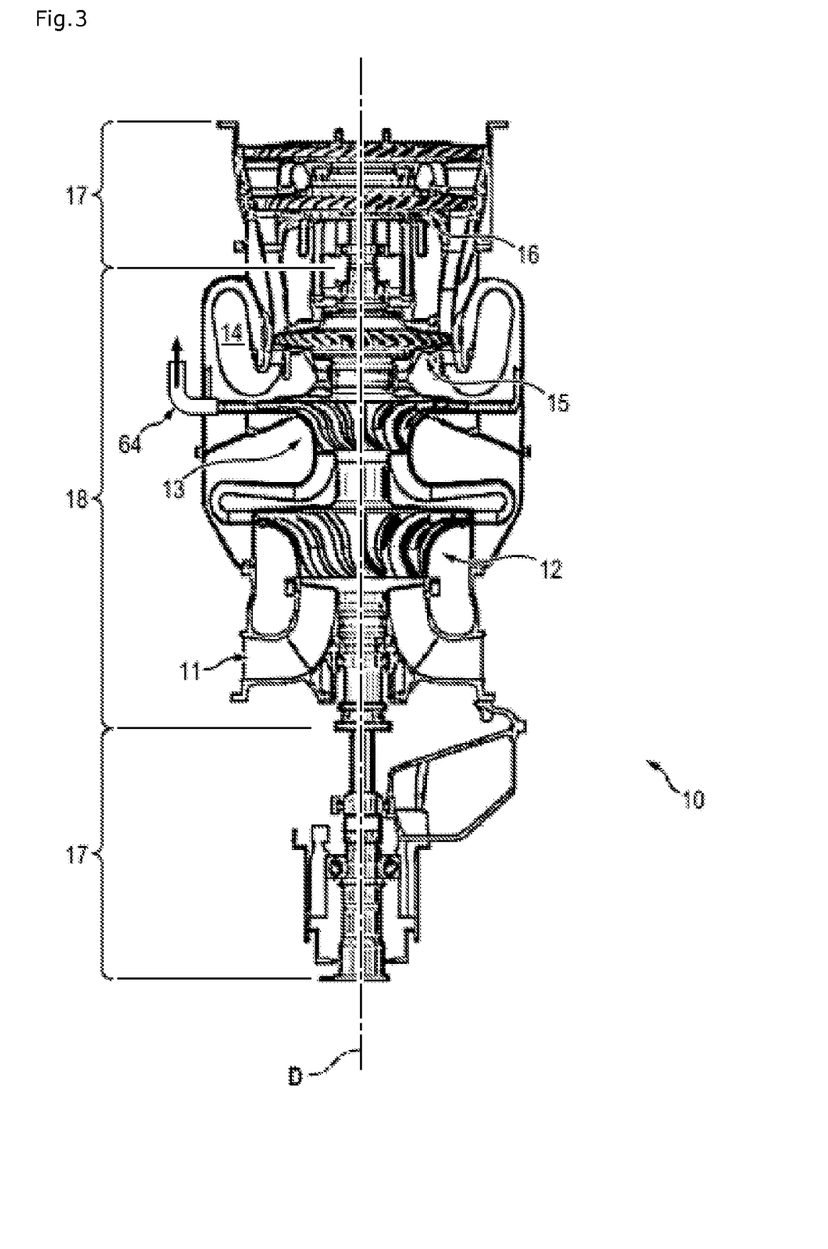
FIG. 3 shows in longitudinal section a helicopter turbomachine configured to drive the rotor of the synchronous machine of FIG. 2 to supply hot gas to a demagnetization device of the synchronous machine of FIG. 2.

FIG. 3 is a schematic section view of a helicopter gas turbine engine 10. The gas turbine engine 10 comprises a rotor with axis D which drives the rotor 2 of the electric machine 1 of FIG. 2. In this example, the gas turbine engine 10 is a gas turbine engine with several stages and a centrifugal compressor.

The gas turbine engine comprises, in the order of air flow when the gas turbine engine is in operation, an air inlet 11, a first centrifugal compressor 12, a second centrifugal compressor 13, a combustion chamber 14, a gas generator turbine 15 and a free turbine 16.

Here, the gas turbine engine 10 has double spools. It comprises a first spool 17 corresponding to the free turbine 16 and a second spool 18 corresponding to the compressors and to the gas generator turbine.

The gas turbine engine 10 comprises a gas stream forming a flow path for the air admitted to the inlet 11, until the exhaust nozzle (not shown) at the outlet of the free turbine 16.

Very advantageously, during the operation of the gas turbine engine, the gas stream serves as a source of hot fluid to supply the device for demagnetizing the permanent magnet 3a.

In the example of FIG. 3 a gas extraction element 64 is positioned in the gas stream of the gas turbine engine 10, to extract hot gas in the stream and to supply it to the duct 60. The element 64 is positioned in series with one end of the duct 60. Here the element 64 is a duct connected, on the one hand, to a portion of the gas stream of the gas turbine engine 10 and, on the other hand, to the duct 60 shown in FIG. 2.

The element 64 is advantageously arranged at the outlet of a compressor of the gas turbine engine 10, so as to recover the hot air which was previously compressed by the members of the gas turbine engine.

In the example of FIG. 3, the element 64 leads into the stream of the gas turbine engine 10 at the plane (commonly called "plane P3") perpendicular to the axis D and passing through the outlet of the second centrifugal compressor 13. As the second centrifugal compressor 13 is located immediately upstream of the combustion chamber 14, one advantage of this configuration is to recover the gas at a very high temperature.

As an alternative or in combination, the extraction of gas can be carried out in the plane (commonly called "plane P2 or P2.5") perpendicular to the axis D and passing through the outlet of the first centrifugal compressor 12, and/or on an exhaust nozzle of the turbomachine (planes P5 and/or P6). Optionally, a suction device is added to the gas extraction point in proximity to the element 64. The suction device is in particular advantageous if the hot gas is extracted at low pressure levels, for example at the exhaust nozzle.

As an alternative, the extraction of gas can be accomplished on a stream of another type of turbomachine to supply the demagnetization device of the permanent magnet.

It is advantageous to use a turbomachine of the helicopter as a source of heat for the demagnetization device, because this source of heat exists already even in the absence of the demagnetization device. A synergy is thus achieved between the function of driving the rotor of the electric machine and the function of forcible demagnetization of the magnets. In addition, extraction of hot gas from a turbomachine has a low impact on the total mass and on the reliability of the propulsion assembly.

Figure 4:
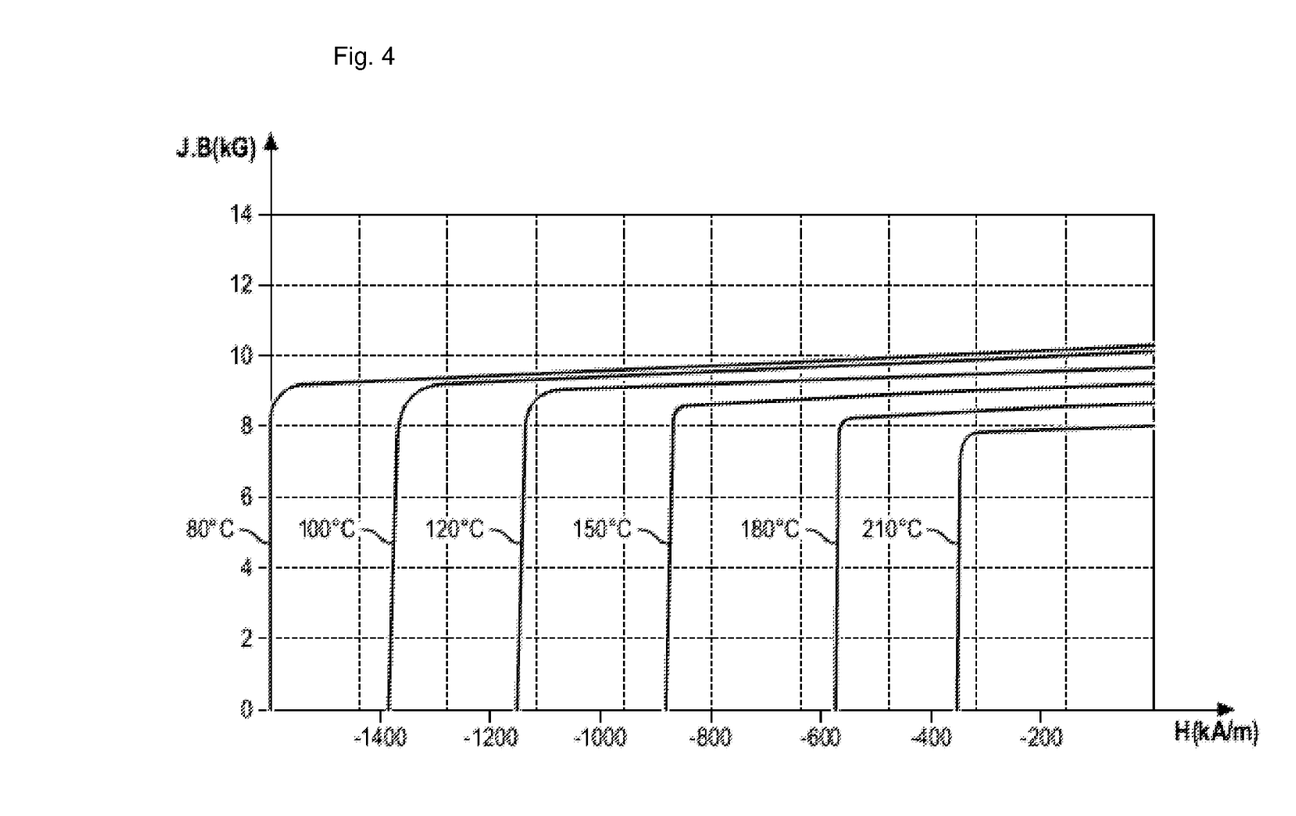
FIG. 4 is a characteristic curve of the demagnetization of a particular permanent magnet, showing in the abscissa axis the demagnetizing field and in the ordinate axis the induction of the permanent magnet.

Shown in FIG. 4 are characteristic curves of the magnetic induction of a magnetic material of the magnet 3a, as a function of the temperature of the magnetic material. In this example, the magnetic material is $Nd_2Fe_{14}B$. The magnetic induction J.B, given here in kiloGauss, is reduced as the demagnetizing field H, given here in kiloamperes per meter, increases in absolute value. As the temperature increases, the magnetic induction is cancelled for an increasingly small absolute value of the demagnetizing field (approximately 1380 kA/m at 100° C., approximately 360 kA/m at 210° C.).

As indicated above, beyond a Curie temperature of the magnet, its magnetic induction is cancelled even in the absence of a demagnetizing field.

By way of examples, the Curie temperatures of several magnetic materials is as follows: from 140° C. to 220° C. for NdFeB, 280° C. for $SmCo_5$, from 350° C. to 550° C. for $Sm_2Co_{17}$, 550° C. for l'AlNiCo, 250° C. for the Strontium type ferrites, from 100° C. to 240° C. for Barium type ferrites.

The demagnetization device of the electric machine 1 is preferably suitable for implementing a temperature increase of the permanent magnet with which it is associated, beyond a temperature determined as a function of the Curie temperature of the magnet.

For example, the demagnetization device is configured to cause the magnet to reach a temperature comprised between 95% and 105% of its Curie temperature, so as to strongly limit the magnetic induction of the magnet.

Preferably, the demagnetization device allows the magnet to reach the Curie temperature, which cancels its magnetic induction.

In fact, the case where the magnet is at 100% of its Curie temperature allows optimal effectiveness of the demagnetization of the permanent magnet, in the absence of any external demagnetizing field.

Thus, the demagnetization device supplies a means of temporarily and rapidly cancelling the magnetic flux generated by the rotation of the magnet, even if the magnet continues to rotate. It is thus possible to protect a winding during a short-circuit event.

Figure 5:
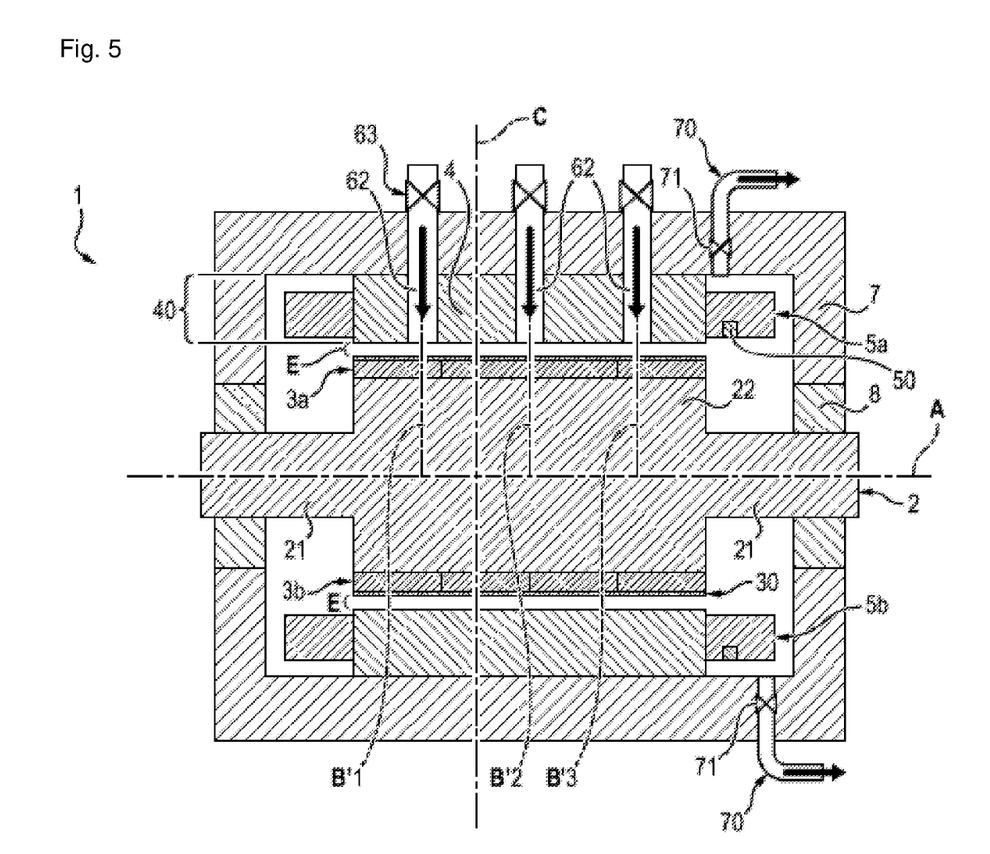
FIG. 5 is a schematic longitudinal section view of a synchronous permanent magnet machine according to a second embodiment of the invention.

FIG. 5 gives a longitudinal section view of a permanent magnet synchronous machine 1' according to a second embodiment of the invention. The section plane passes through the axis A of the shaft of the rotor 2.

The internal structure of the machine 1', and in particular the arrangement of the rotor 2 and of the stator, are in conformity with the description above in relation to the machine 1 of FIG. 2.

Instead of the duct 60, the machine 1' comprises a plurality of ducts 62. Like a duct 60, the ducts 62 place a hot fluid source external to the electric machine in fluid communication with a volume located in proximity to the permanent magnet 3a. Here, the ducts 62 extend respectively along the mutually parallel axes B1, B2 and B3 perpendicular to the axis A of the shaft of the rotor.

Each of the ducts 62 extends from outside the housing 7 to the inner surface of the stator 4, through the housing 7 and through the stator 4. The ducts 62 pass through the stator 4 by through openings 40.

The ends of the ducts 62 thus lead onto the surface of the permanent magnet 3a.

Valves 63 are preferably located at the outer ends of the ducts 62, to control an admission of hot fluid through these ducts. These ducts are electronically controllable, for example by an on-board computer in the helicopter.

As an alternative, it is possible to use a single duct 62 or any number of ducts.

It is possible to use the ducts 62 in place of or as complements to ducts 60 having terminal portions 61. A structure combining the two orientations of ducts allow a greater total mass flow of hot fluid into proximity with the permanent magnet(s), which accelerates the temperature increase.

The jet of hot gases can thus be accomplished axially and/or radially with respect to the axis A of the shaft of the rotor.

More generally, the shape and the arrangement of the ducts of the demagnetization device can be adapted depending on the structure of the electric machine, mass and bulk constraints or the need for temperature increase of the magnets.

A hot fluid is not necessarily used as a heat source for the demagnetization device. Numerous types of heat source can be contemplated. It is possible in particular to replace the duct 60 with an electrical resistor, the resistor being positioned in proximity to the permanent magnet for which the magnetic flux shall be cancelled.

The invention claimed is:

1. An electric machine for an aircraft, the electric machine comprising:
   a stator and a rotor rotatable with respect to the stator, the rotor or the stator comprising a plurality of permanent magnets;
   a demagnetizing device that is configured to demagnetize at least one permanent magnet of the plurality of permanent magnets to implement a temporary temperature increase of the at least one permanent magnet in order to limit an exciter magnetic flux generated by the at least one permanent magnet during the temporary temperature increase;
   a winding arranged so that an induced electrical current circulates in the winding under the influence of an exciter magnetic flux produced by the at least one permanent magnet during the rotation of the rotor; and
   a winding fault sensor,
   wherein the demagnetization device generates the temporary temperature increase of the at least one permanent magnet when a winding fault is detected by the winding fault sensor.

2. The electric machine according to claim 1, wherein the demagnetization device is configured to circulate a hot fluid in proximity to the at least one permanent magnet or within the at least one permanent magnet.

3. The electric machine according to claim 2, wherein the demagnetization device comprises a duct, a terminal portion of the duct leading to a surface of the at least one permanent magnet or into an internal volume of the at least one permanent magnet.

4. The electric machine according to claim 3, wherein a portion of the duct extends along an axis of a shaft of the rotor, the terminal portion of the duct extending in the rotor from the portion of the duct to the at least one permanent magnet.

5. The electric machine according to claim 3, wherein a portion of the duct extends perpendicularly to an axis of a shaft of the rotor, from an outside of the electric machine to an inside surface of the stator.

6. The electric machine according to claim 1, wherein the electric machine is of a radial flux type, and the rotor has a cylindrical shape.

7. The electric machine according to claim 1, wherein the electric machine is of an axial flux type, and the rotor has a discoidal shape.

8. The electric machine according to claim 1, wherein the at least one permanent magnet has a Curie temperature and the demagnetization device implements the temporary temperature increase of the at least one permanent magnet above the Curie temperature.

9. An assembly comprising:
   the electric machine according to claim 1; and
   a hot fluid source, the hot fluid source being configured to supply a hot fluid to the demagnetization device of the electric machine.

10. The assembly according to claim 9, further comprising a gas/gas heat exchanger or a gas/liquid heat exchanger, the gas/gas heat exchanger or the gas/liquid heat exchanger being positioned between the hot fluid source and the electric machine.

11. The assembly according to claim 9, comprising a turbomachine, the turbomachine comprising a gas stream serving as a hot fluid source during an operation of the turbomachine, and comprising a hot gas extraction element in the gas stream.

12. The assembly according to claim 11, wherein the hot gas extraction element is configured to admit a hot gas from an extraction plane defined perpendicular to an axis of the turbomachine, the extraction plane being selected from:
   a plane called plane P3, extending over an outlet of a final compressor stage of the turbomachine, the final compressor stage being located immediately upstream of a combustion chamber of the turbomachine; and
   a plane called plane P2.5, extending over an outlet of a compressor stage of the turbomachine different from the final compressor stage.

13. The assembly according to claim 11, wherein the extraction element is configured to admit a hot gas from an extraction point located in an exhaust nozzle of the turbomachine.

14. An aircraft comprising the assembly according to claim 9.

* * * * *